UNITED STATES PATENT OFFICE.

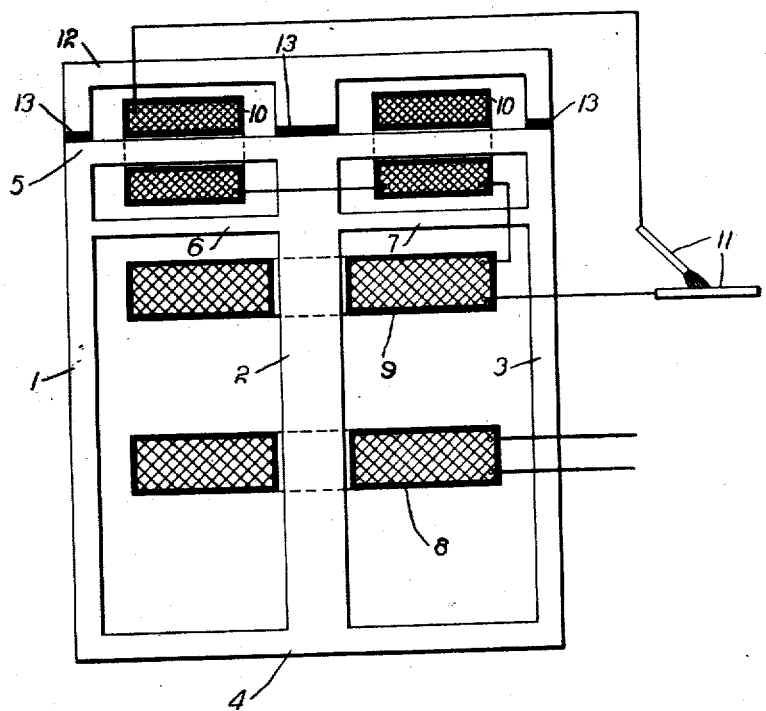

HANS FAHNOE, OF PITTSBURGH, PENNSYLVANIA, ASSIGNOR TO WESTINGHOUSE ELECTRIC & MANUFACTURING COMPANY, A CORPORATION OF PENNSYLVANIA.

ELECTRIC-ARC-WELDING SYSTEM.

1,343,208.

Specification of Letters Patent. Patented June 15, 1920.

Application filed September 8, 1919. Serial No. 322,537.

*To all whom it may concern:*

Be it known that I, HANS FAHNOE, a citizen of the United States, and a resident of Pittsburgh, in the county of Allegheny and State of Pennsylvania, have invented a new and useful Improvement in Electric-Arc-Welding Systems, of which the following is a specification.

My invention relates to arc welding systems, and, more particularly, to transformers which may be incorporated in alternating-current welding systems. The primary object of my invention is to provide a simple alternating-current welding system embodying characteristics which shall insure the production of strong and homogeneous welds by moderately skilled operators.

It has been found that alternating-current welding systems possess certain desirable features and certain distinct advantages over direct-current welding systems. For example, alternating-current welding systems may be made lighter in weight and more compact and, therefore, more readily portable than direct-current systems. Furthermore, alternating-current systems have been found to be less expensive and are, therefore, desirable from the view point of economy of installation. However, certain difficulties have been met, in welding by means of alternating current, because it is difficult to establish an arc and this difficulty is believed to exist on account of the reversals of current.

I have found that the starting characteristics of an alternating-current system may be considerably improved by employing a relatively high voltage during the period of establishing an arc. Although a relatively high voltage is desirable to facilitate the establishment of an arc, it is not necessary to employ such a high voltage to sustain the arc, under operating conditions.

One object of my invention, therefore, resides in the provision of a welding system in which a relatively high voltage may be utilized during the period of establishing an arc and in which an arc-sustaining voltage of a lower value shall be automatically established after the arc has been drawn.

Another object of my invention is to provide an alternating-current welding system by connecting a plurality of electrodes to the secondary winding of a transformer, employing no moving parts or other equipment than the transformer and the necessary electrodes.

With these and other objects in view, my invention will be more fully described and illustrated in the single figure of the drawing which is a diagrammatic view of a transformer having its secondary winding connected to a plurality of electrodes to provide an alternating-current welding system, in accordance with my invention.

In practising my invention, I may employ a transformer comprising the usual type of laminated core member which, however, is so formed that the primary and secondary windings may be adjustably mounted thereon to provide for various values of welding current being drawn from the secondary winding, depending upon the character of work to be done. I also employ a plurality of auxiliary windings which are connected in series with the secondary winding and the electrodes. The auxiliary windings function to supplement the action of the secondary winding and cause a relatively high voltage to be available across the electrodes, under open-circuit conditions, but, when an arc has been established between the electrodes and current is flowing in the secondary winding, the auxiliary windings act as a stabilizing reactance in the welding circuit.

In the drawing is shown a transformer comprising a core member having three legs, 1, 2 and 3, which are connected, at their respective ends, by straight members 4 and 5. Additional members 6 and 7 may be employed to connect the legs 1, 2 and 3, adjacent one end of the core member, thus formed, to provide magnetic paths substantially parallel to the end member 5. A primary winding 8 and a secondary winding 9 may be so mounted upon the central leg 2 as to be adjustable with respect to each other. The windings 8 and 9 are disposed at the side of the additional members 6 and 7 which comprises the major portion of the core member. A plurality of auxiliary windings 10 may be mounted upon the end member 5, one at each side of the central leg 2. The auxiliary windings 10 may be connected in series with the secondary winding 9 and in series with one of a plurality of electrodes 11, the other electrode of which may be connected to the secondary winding 9. A member 12, of substantially E-shape, may be disposed over the auxiliary windings 10 and be insulated from the member 5 of the core, as indicated at 13.

In operating the above described welding system, the primary and secondary windings may be adjusted relative to each other to provide for a suitable current being drawn in the secondary circuit. The character of the work governs, to a great extent, the value of the welding current employed. It will be appreciated, of course, that, if the primary and secondary windings are separated from each other, less current will be drawn from the secondary winding than when the windings are closely coupled. This is true because the leakage reactance introduced between the windings, when separated, causes a reduction of the secondary current.

In order to perform a welding operation, the primary winding is connected to a suitable supply circuit and the system is then in readiness for operation. Under open-circuit conditions, or before an arc has been established between the electrodes 11, the auxiliary windings 10 increase the voltage which is normally established by the inductive action between the primary winding 8 and the secondary winding 9, and, therefore, make a higher voltage available across the electrodes 11. When the electrodes have been engaged, preliminarily to establishing an arc, the current, of course, flows in the secondary circuit and the action of the auxiliary windings 10 is reduced to a stabilizing action. This is caused by a change of the path of flux in the transformer, which change is due to the increased reactance between the primary and the secondary winding.

For example, when no current flows in the secondary winding, the magnetic paths which the flux follows is divided between the members 6 and 7 and the end member 5, but, when current flows in the secondary winding 9, the flux that reaches the end of the core member, adjacent the auxiliary windings 10, travels through the additional members 6 and 7 and is, therefore, diverted from the end member 5. The auxiliary windings 10, of course, establish a flux in the magnetic paths at the end of the transformer but this flux does not link with the flux of the secondary winding 9 when current is flowing therein and the auxiliary windings act, under these conditions, merely as reactance in the secondary circuit.

It will be appreciated from the foregoing description that the auxiliary windings 10 are of distinct advantage, both during the period of establishing the arc and under operating conditions. When an arc is being established, the auxiliary windings supplement the action of the secondary winding and make a relatively high voltage available across the electrodes and, after an arc has been established between the electrodes, this starting voltage is reduced somewhat by confining the action of the auxiliary windings to a stabilizing reactance. The latter condition is highly desirable in that it stabilizes the arc and makes the welding operation more easily performed.

It is obvious, from the foregoing description, that I have provided a simple alternating-current welding system embodying certain characteristics which facilitate the establishment and maintenance of an arc without the employment of moving apparatus or auxiliary equipment. The transformer functions to automatically establish the above described characteristics, and, therefore, permits of the operator giving his entire attention to the production of good welds. By providing a welding system which is practically contained in a transformer, I have reduced the expense and bulk of the system to a minimum.

Although I have specifically described and shown a transformer embodied in a welding system, it is obvious that minor changes may be made therein, without departing from the spirit or scope of my invention, and I desire, therefore, that no limitations shall be imposed except such as are indicated in the appended claims.

I claim as my invention:—

1. An arc welding system comprising a transformer including a core member, primary and secondary windings mounted thereon, a plurality of auxiliary windings so mounted upon the core member and connected to the secondary winding as to be automatically excluded from the main magnetic circuit when current is flowing in the secondary winding and a plurality of electrodes connected in the secondary circuit.

2. An arc welding system comprising a transformer including a core member, primary and secondary windings mounted thereon, a plurality of stationary auxiliary windings so mounted upon the core member and connected to the secondary winding as to be automatically excluded from the main magnetic circuit when current is flowing in the secondary winding and a plurality of electrodes connected in the secondary circuit.

3. An arc welding system comprising a transformer including a core member, primary and secondary windings adjustably mounted thereon, a plurality of stationary auxiliary windings so mounted upon the core member and connected to the secondary winding as to be automatically excluded from the main magnetic circuit when current is flowing in the secondary winding and a plurality of electrodes connected in the secondary circuit.

4. An arc welding transformer comprising a laminated core member having three legs and members connecting their respective ends, additional members connecting the three legs adjacent one end of the core member thus formed to provide magnetic paths substantially parallel to the adjacent connecting end member and a plurality of windings mounted upon the end member adjacent the additional members and connected in series with the secondary winding.

5. An arc welding transformer comprising a laminated core member having three legs and members connecting their respective ends, additional members connecting the three legs adjacent one end of the core member thus formed to provide magnetic paths substantially parallel to the adjacent connecting end member, a plurality of auxiliary windings mounted upon the end member adjacent the additional members and connected in series with the secondary winding and a member of substantially E-shape disposed over the auxiliary windings and insulated from the core member.

In testimony whereof I have hereunto subscribed my name this 30th day of Aug., 1919.

HANS FAHNOE.